United States Patent [19]
Osburn et al.

[11] 3,825,245
[45] July 23, 1974

[54] WORKPIECE CHANGER MECHANISM FOR A MACHINE TOOL

[75] Inventors: John G. Osburn, Milwaukee; John J. Schachte, Wauwatosa, both of Wis.

[73] Assignee: Kearney & Trecker Corporation, West Allis, Wis.

[22] Filed: Apr. 24, 1972

[21] Appl. No.: 246,827

[52] U.S. Cl. .................. 269/30, 29/33 P, 29/563, 198/24, 198/25, 214/1 BC, 269/31, 269/57, 269/63, 408/67
[51] Int. Cl. ....... B23q 3/08, B23q 1/06, B65q 47/04
[58] Field of Search ............ 269/30, 31, 55, 56, 57, 269/63, 321 R, 321 ME; 408/67; 198/25, 24; 214/1 BC

[56] References Cited
UNITED STATES PATENTS

| | | | |
|---|---|---|---|
| 2,154,992 | 4/1939 | Pearson | 214/1 BC |
| 2,264,497 | 12/1941 | Agan | 269/56 UX |
| 2,692,693 | 10/1954 | Newburg | 214/1 BC |
| 2,779,490 | 1/1957 | Clarke et al. | 198/24 X |
| 3,010,371 | 11/1961 | Riedel et al. | 29/33.12 X |
| 3,054,333 | 9/1962 | Brainard et al. | 29/33 P |
| 3,115,974 | 12/1963 | Kovach | 214/1 BC |
| 3,208,602 | 9/1965 | Laidig et al. | 214/1 BC |
| 3,238,615 | 3/1966 | Leone et al. | 29/568 |
| 3,255,861 | 6/1966 | Fritz | 214/1 BC |
| 3,576,540 | 4/1971 | Fair et al. | 29/33 P |

*Primary Examiner*—Al Lawrence Smith
*Assistant Examiner*—J. T. Zatarga
*Attorney, Agent, or Firm*—Cyril M. Hajewski; Donald E. Porter

[57] ABSTRACT

This invention relates to a work changing mechanism comprising a plurality of separate work receiving pellets, a working station for receiving one pallet for performing a working operation, and a plurality of storage stations including one empty storage station. A plurality of separate pallet securing means are associated with the storage stations, and are separately extensible relative to the working station. One of the securing means is operable to releasably retain a pallet in a storage station for selective interchange with a pallet supporting a workpiece for the performance of an operation in the working station. Another of the securing means in a storage station is empty and is selectively operative to bodily retract the pallet then in the operating station at the completion of the operation performed on the workpiece carried by that pallet. Retraction of the pallet from the operating station to the storage station by the empty securing means, is accomplished by the other securing means bodily interchanging the stored pallet in position in the now empty operating station.

9 Claims, 12 Drawing Figures

WORKPIECE CHANGER MECHANISM FOR A MACHINE TOOL

BACKGROUND OF THE INVENTION

In the past, various kinds of power actuators have been available for effecting selective positioning movement. For example, indexable positioning mechanisms presently are operable to selectively interchange workpieces between a single operating station and a plurality of storage stations. Thus, a work pallet is moved from an operating station to an empty one of a pair of indexable storage stations. The storage stations are then indexed to return the pallet containing the completed workpiece to more remote storage, and indexing a remote stored pallet into a position adjacent to the operating station. The pallet carrying the stored workpiece is then transferred to the operating station. In the presently available means for indexably positioning work pallets between storage and transfer stations, however, extremely complex mechanical index control means comprise either complex gear trains, or equally complex rack and pinion actuators. Usually such mechanical indexers are coupled with additional lineal mechanical actuators to return a completed workpiece from an operating station to one empty storage station, as well as advance the next workpiece from storage to the operating station.

SUMMARY OF THE INVENTION

According to this invention, there is provided an extremely accurate two-position rotary shuttle or indexing mechanism adapted to achieve an extremely high degree of accuracy with noncritical components. The present mechanism is particularly adapted for incorporation into a transfer interchange mechanism for workpiece changers, for tool changers, or for combinations of both. To achieve the requisite accuracy in either a clockwise or counterclockwise direction of rotation, a pair of separate and individually extensible cylinder rod mechanisms are cooperatively disposed to convert separate rectilinear actuating forces into rotational indexing movements.

In one preferred embodiment hereinafter described, each of the separate cylinder rod mechanisms is a selectively extensible power actuator journalled at its outer end to separate input control axes fixedly journalled at approximately 90° spaced apart positions. At their respective opposite or inner ends however, each of the separately extensible power actuators is rotatably connected to separate input control bearings that are journalled to rotate about inner axes spaced concentrically outward from the rotary axis of a rotary member being indexably driven. Thus, the rotatably guided and concentrically spaced outer ends of the respectively extensible power actuators are guided through 180° semicircles simultaneously with the rectilinearly initiated 180° semicircular indexable movement of the principal rotary member.

In operation, it will be assumed the rotatable member is initially driven from a zero degree clockwise position to rotate 180° in a counterclockwise direction through sequential first and second 90° quadrants of counterclockwise indexable movement. Subsequent to arrival and hydraulically forcible coactive retention of both power actuators in continuously urged counterclockwise direction of movement, other selectively operable rectilinear indexable movements are selectively available to further facilitate a selective interchanging movement of tools or workpieces.

A principal object of the invention is to provide a greatly improved indexable positioning mechanism for a rotatable member.

Another object of the invention is to provide a pair of rectilinearly extensible power actuators cooperatively connected to indexably move a rotary member a predetermined distance in a clockwise or counterclockwise direction.

Another object of the invention is to provide an improved velocity control mechanism for work or tool changers.

A further object of the invention is to provide improved control means for effecting selective contractible and extensible operation of a hydraulic power actuator to selectively convert rectilinear movement into a full 180° of rotatable indexable movement.

A still further object of the invention is to control indexable movement of a rotatable member through a full 180° semicircle in either direction.

BRIEF DESCRIPTION OF THE DRAWINGS

The obvious features and advantages of the present invention will become more apparent from the following detailed description of a preferred embodiment shown in the accompanying drawings in which:

FIG. 9 is a diagrammatic view of the hydraulic control circuit including two separate pairs of rectilinear power actuators;

FIG. 10 is a fragmentary view in side elevation of a clamped pallet after vertical upward movement thereof into disengaged released position relative to the operating station and into vertical latched engagement with an inserted pallet change arm;

FIG. 11 is a fragmentary view in side elevation to illustrate rectilinear insertion of an extensible pallet change arm into a complementary opening presented in a work pallet then being maintained in vertically downward clamped engagement in an operating station; and, FIG. 12 is an enlarged fragmentary view in perspective of the complementary latches.

DESCRIPTION OF THE PREFERRED EMBODIMENTS

Figure 1:
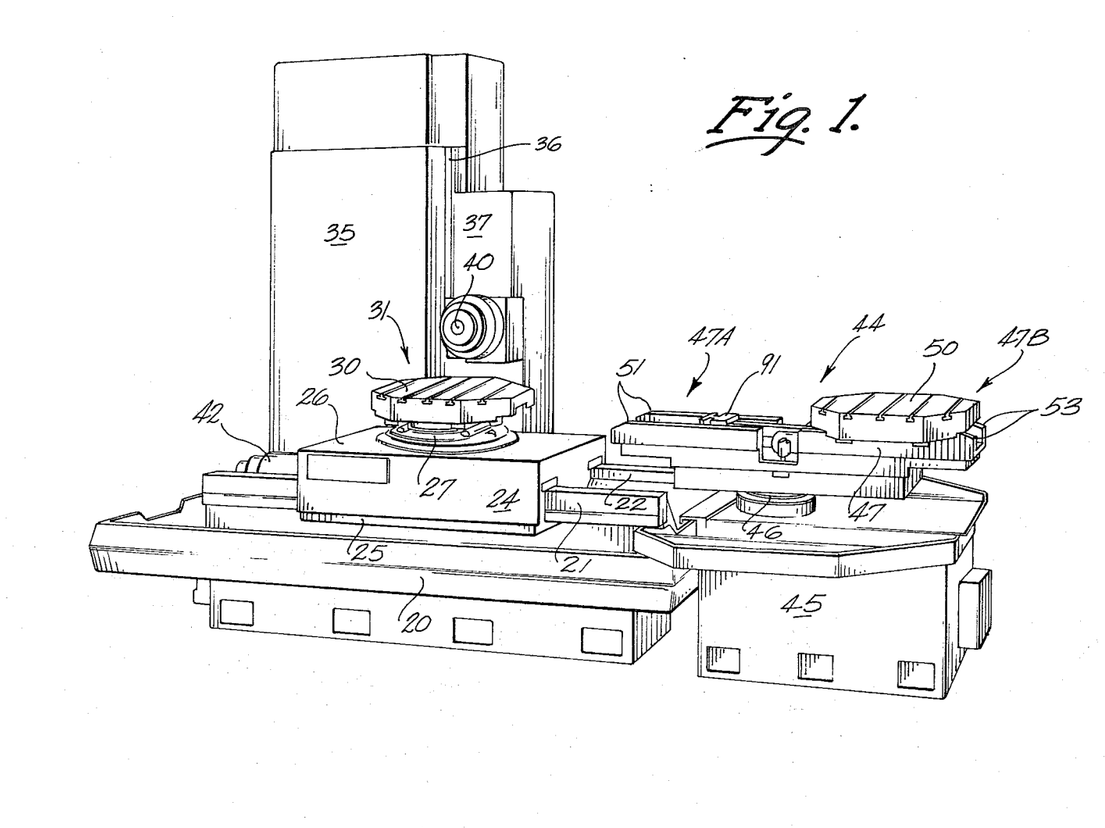
FIG. 1 is a perspective view of a machine tool incorporating the present invention.

Referring now to the drawings and specifically to FIG. 1, there is shown a perspective view of a milling machine embodying the features of the present invention. As there shown, the machine comprises a principal horizontal bed 20 supporting with its forward portion a pair of horizontal table ways 21 and 22. A principal table 24 is provided with the usual complementary ways that are continuously maintained in slidable engagement with table ways 21 and 22 in well-known manner by a pair of front and rear gibs, such as the forward gib 25 shown in FIG. 1. Upon its upper surface 26, the machine table 24 supports an indexable pallet table 27 that is selectively rotatable through a full 360°. As will be explained, a work carrying pallet 30 is releasably clamped to the pallet table 27 for selective indexable movement therewith.

In addition to horizontal ways 21 and 22, the machine base 20 extends in a direction to provide rearwardly extending transverse ways (not shown) disposed to slidably support a vertically upstanding column 35. Although not shown in detail, it should be noted the column 35 is slidably secured to the transverse machine ways in well-known manner by gibs (not shown) for power driven transverse movement along a Z axis.

To provide vertical or Y axis of movement, the vertical column 35 is provided with the usual parallel spaced, vertically upstanding ways, only the forward vertical column way 36 being illustrated in FIG. 1. Spindle head 37 is slidably secured to the front and rear axis column ways, including the forward vertical way 36, by gibs in the usual manner. Likewise, a horizontal tool receiving spindle 40 is rotatably journalled in the spindle head 37 for selective rotatable power driven movement. To perform a machining operation on a workpiece (not shown) secured to the pallet 30, a milling cutter (not shown) carried by the tool spindle 40 is selectively movable in known manner by effecting relative bodily movement between the spindle 40 and pallet 30. The usual power driven transmissions (not shown) are connected in well-known manner to effect selective rotation of the tool spindle 40, vertical movement of the spindle head 37 along the Y axis, and transverse movement of the vertical column 35 along the transverse or Z axis. The third or X axis of relative movement is effected by a reversible motor 42 operatively connected to selectively actuate a screw and nut mechanism (not shown) and connected to effect relative horizontal movement of the table 24 in either direction along the machine ways 21 and 22.

Figure 2:
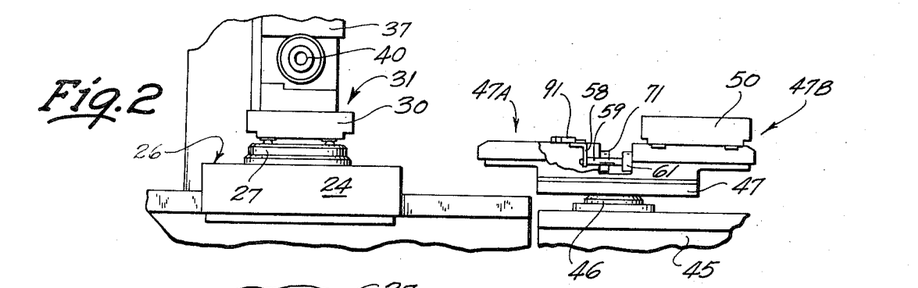
FIGS. 2 to 6 inclusive are a series of fragmentary views in elevation illustrating different selected positions of the work changer in effecting an interchange of work pallets.
Figure 3:
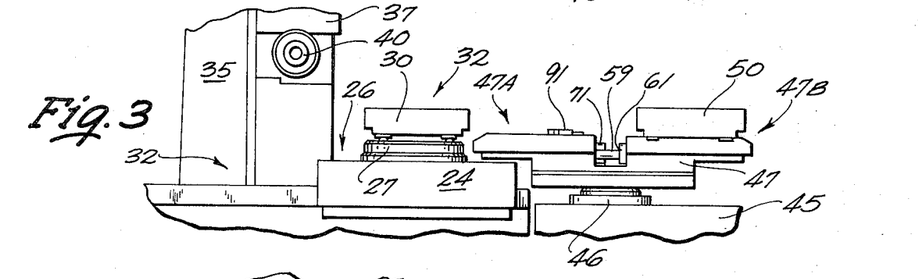

In addition to effecting X axis movement of the table 24 and work pallet 30 carried thereby in the machining station 31 relative to tool spindle 40, motor 42 is operative to move table 24 to its rightward limit of X axis movement in preparation for a work or pallet changing operation. Rightward X axis movement of work table 24 from its operating station 32, FIGS. 1 and 2, effects location of the work pallet 30 carried thereby in a position immediately adjacent the pallet changing mechanism 44 as shown in FIG. 3, the second in a series of five views showing a pallet changing operation.

Work changer 44 is shown in FIG. 1 as comprising a principal machine base 45, an index table 46 rotatably supported by the base, and a pallet support 47 carried by the index table 46 for 180° indexable movement.

It will be readily apparent that the work changer base 45 can be mounted adjacent the complete machine base 20, as shown in FIG. 1, or these bases combined into one unitary structure. In either case, the work table 24 and indexable pallet support 47 are relatively moved toward one another into the closest rectilinear proximity by operation of the X axis drive motor 42. Subsequent to this, as will hereinafter be explained, the pallet changer 44 is operative to effect a bodily interchange between the pallet 30 secured to the machine index table 27 and the pallet 50 shown in FIG. 1 as being clamped in the rightward storage station 47B of the indexable pallet support 47. After an interchange has been completed, pallet 50 now on support 47 will have been bodily transferred into the operating position 32 on the machine index table 27.

Before explaining the mode of operation in detail, it may be an advantage to briefly summarize the principal cooperating parts comprising the work or pallet changer 44. As viewed in FIG. 1, the pallet support 47 is provided at its opposite ends with two pairs of rectilinearly aligned pallet receiving ways 51 and 53 respectively. Associated with the pallet ways 51 is a pallet engaging arm 55 that is carried for parallel, rectilinear movement. In like manner, there is associated with the pallet ways 53 at the opposite end of the pallet support 47 a rectilinearly movable pallet engaging arm 65.

Figures 9, 10, 11, 12:
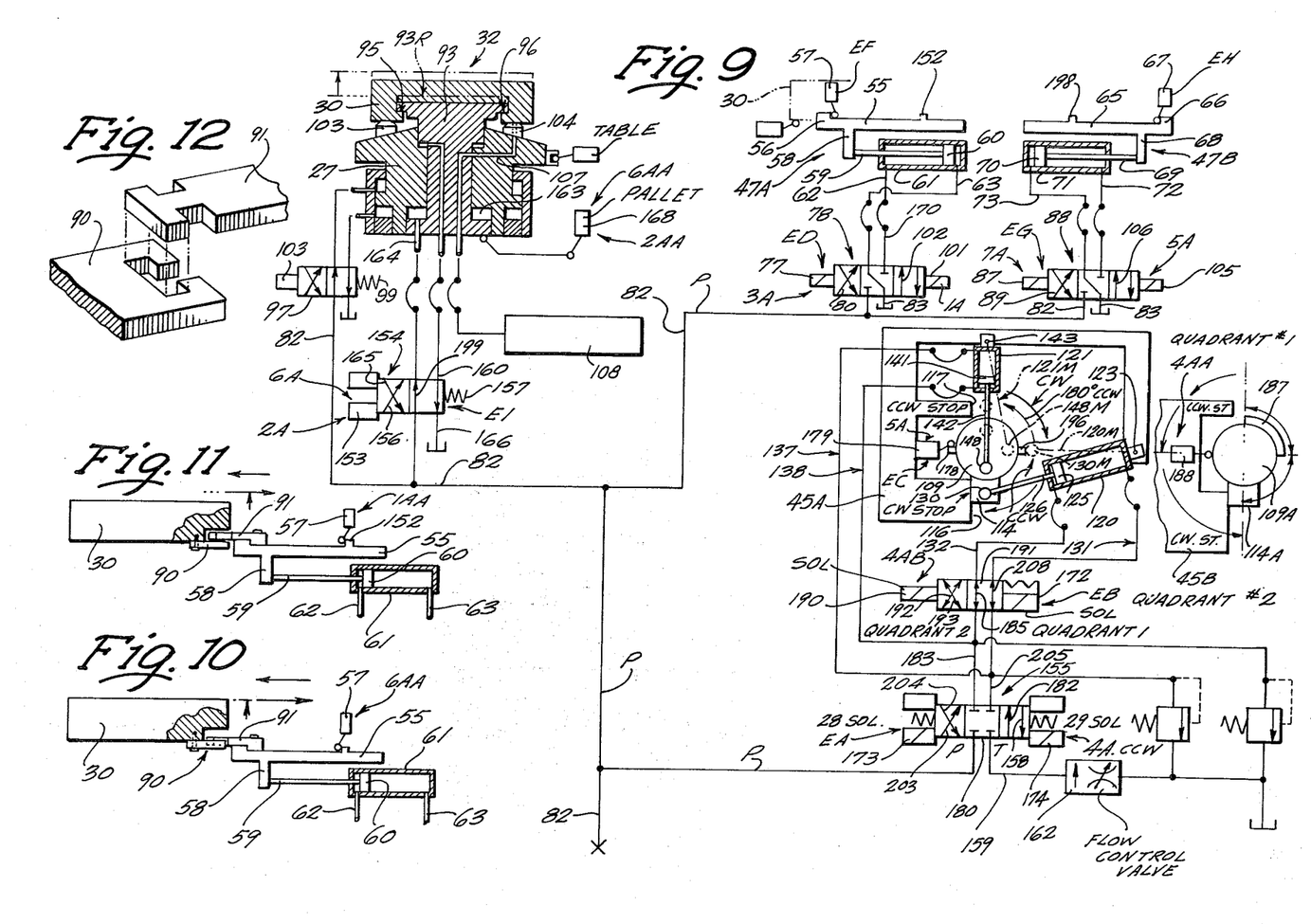

As shown in FIGS. 9, 10 and 11, pallet engaging actuating arm 55 is fixedly secured by an offset bracket 58 to a piston rod 59, that is attached to a piston 60 mounted within an associated stationary, hydraulically actuated cylinder 61. To effect selective rectilinear movement of piston 60, the cylinder 61 is connected to its opposite ends to receive pressure fluid via input lines 62 or 63 respectively. With input line 62 connected to supply pressure fluid to the left end of the cylinder 61, as shown in FIG. 9, and the rightward end connected to exhaust via line 63, the piston 60 is urged to its extreme inward, retracted position in cylinder 61 as shown. Such hydraulically initiated movement of the piston 60 effects corresponding rightward movement of piston rod 59 and the pallet engaging actuating arm 55 secured thereto. Whenever the pallet support 47 is maintained in its 180° leftwardly or clockwise indexed position, the associated pallet ways 51 and pallet arm 55 is in like leftwardly indexed position relative to the machine table 24 or operating station 32, as shown in FIGS. 1, 2 and 9. Such rightwardly urged or inward retracted movement of pallet actuating arm 55 occurs during several principal conditions of leftwardly CW indexed movement of pallet support 47.

First, with pallet 30 clamped in the machining station 31 and supporting an uncompletely machined workpiece (not shown), pallet arm 55 is maintained in a hydraulically retracted empty position as now shown in FIG. 9. Second, after machining is completed, the empty pallet arm 55 is extensibly advanced outwardly into positive latched engagement with pallet 30, as will be explained; and then again reversibly retracted inwardly to the position shown together with the pallet 30 and the now completely machined workpiece (not shown) carried thereby.

Inasmuch as the indexably positionable pallet storage stations 47A and 47B in FIGS. 2, 9, 10 and 11 are identical in function, corresponding parts are identified by similar numbers. Because of this, numbers 65, 68, 69 and 70 respectively identify the pallet engaging arm, connecting bracket, piston rod and piston associated with those parts now positioned in storage station 47B. In addition to the prior enumerated parts in station 47B, cylinder 71, and inlet lines 72 and 73 associated therewith, perform functions corresponding to similar parts described in connection with storage station 47A.

To retain pallet arms 55 and 65 in dynamically retracted position as described and as schematically illustrated in FIG. 9, actuating limit control dogs 56 and 66 are first moved into engagement with, and then respectively maintained in actuating engagement with the associated fixedly positioned limit switches 57 and 67 secured within the pallet support base 45. In response to originally initiated actuation of fixed limit switch 57, an electrical control circuit is connected to energize solenoid 77 to move valve spool 78 from central to rightwardly energized position. From main supply line 82, pressure fluid is then transmitted via a diagonal valve spool line 80 in rightwardly moved valve spool 78 to inlet line 62 connected to urge piston 60 to retracted position as shown. At this time, the forward, outward end of cylinder 61 is connected to exhaust via line 63 and thence via the diagonal line in rightwardly urged spool 78 to exhaust line 83.

Simultaneously, pallet arm 65 is maintained in the inward retracted position in rightward storage station 47B while being latched in engagement with pallet 50. A vertically releasable latching mechanism is operative to latch pallet 50 to pallet arm 65, FIGS. 2 to 6, and operates identically to latches 90 and 91 as will be described in FIGS. 10, 11 and 12 as latching pallet 30 to arm 55. In a manner similar to that described in reference to pallet arm 55, original retracting movement of pallet arm 65 had occurred in response to inner, rearward movement of limit control dog 66 carried thereby into actuating engagement with fixed limit switch 67 carried by the pallet support base 45. Actuation of fixed switch 67 is connected to energize a solenoid 87 operatively connected to effect rightward movement of a valve spool 88 to engaged position from neutral position, and connecting a diagonal line 89 therein to transmit pressure fluid from supply line 82 to inlet line 72. The flow of pressure fluid continues from line 72 into cylinder 71, urging piston 70 to its fully retracted inward position with fluid being exhausted by line 73 which is connected by another line in the rightwardly urged valve spool 88 to exhaust line 83.

From the dynamically retracted positions shown and described in FIG. 9, the pallet engaging arms 55 and 65 are selectively and sequentially advanced into extensibly outward position and sequentially retracted therefrom to the positions shown.

To operate the pallet changer 44 for effecting a complete pallet interchange between the machine operating station 32 and pallet support 47, cooperatively engageable latches 90 and 91 are respectively secured to the pallet 30 and pallet arm 55, as shown in FIGS. 10, 11 and 12. In the enlarged fragmentary perspective view, FIG. 12, the latches 90 and 91 are illustrated as positioned in vertically released or disengaged positions. From the disengaged position shown in FIG. 12, it will be apparent that vertical relative movement of the latches 90 and 91 toward one another effects relative and operative intermeshing engagement therebetween. After latches 90 and 91 are moved into such relative vertical meshing engagement, either retracting or extensible rectilinear movement of latch 91 and associated actuating arm 55 is disposed to effect corresponding rectilinear movement of the then engaged pallet 30.

Prior to pallet 30 being engaged by the vertically movable pallet clamp 93, FIG. 9 for example, pallet clamp 93 is vertically urged upward, and completely released, as indicated at the broken line 93R, e.i. prior to any pallet being rectilinearly advanced into position on the clamp. At the same time, pallet receiving ways 95 and 96 are likewise moved into corresponding vertically upward released position, as well as being rectilinearly aligned with a pallet 30, such as indicated in fragmentary form by broken lines as being supported by retracted pallet engaging arm 55. In explanation, it will be understood that prior to rectilinear advancement of pallet 30 into the operating station 32, pallet clamp 93 is not only urged vertically upward to the broken line released position 93R, but also rotated 90° into rectilinear alignment relative to the retracted pallet arm 55. It will be further understood that such original 90° positional rotation of the index table 27 and vertically released pallet clamp 93 carried thereby had likewise effected 90° rotation of the spaced apart, parallel support ways 95, 96 presented by the pallet clamp into alignment with the ways 51 supporting the pallet 30 for extensible outward movement. A control valve 97 is resiliently urged leftward by a spring 99 connected to transmit pressure fluid from supply line 82 to urge index table 27 to vertically downward position as shown. Energization of a solenoid 103 effects rightward movement of control valve 97 to transmit pressure fluid from line 82 to move index table 27. An index mechanism (not shown) is then operable to effect indexable movement of the table 27 in well-known manner.

After the described 90° rectilinear alignment of the pallet clamp ways 95 and 96 with pallet arm 55 and the support ways therefor, pallet arm 55 is extensibly advanced from its retracted position shown in FIG. 9. Pallet arm 55 effects like extensible advancement of pallet 30 from its original retracted, stored position (indicated by fragmentary broken lines in FIG. 9) into direct rectilinear engagement with the then 90° rectilinearly aligned ways 95 and 96 presented by the upward, vertically released pallet clamp 93R. An example of such original extensible advancement of pallet engaging arm 55 from retracted position to advance the still latched pallet 30 into engagement with the ways, is illustrated in FIG. 10. After the pallet 30 is slidably advanced into full rectilinearly extensible engagement with the upwardly disengaged ways 95, 96, the pallet clamp 93 is urged vertically downward to its solid line position shown in FIG. 9 to clamp the pallet to positioning buttons 103 and 104 presented by the pallet index table 27. Vertically downward movement of the pallet clamp from its upper broken line position 93R to its lower solid line position 93 has the dual effect of disengaging pallet latch 90 from engagement with arm latch 91, as shown in FIG. 11, and forcibly clamping the pallet 30 to index table 27, as shown in FIG. 9. With pallet 30 then downwardly clamped to the table 27 in the operating station 32, the consequently upwardly disengaged pallet arm latch 91, FIG. 11, and associated arm 55 are retractible from the outward position to the inward and empty storage position shown and described in FIG. 9. Table 27 is provided with four vertical positioning buttons, two of which are shown in FIG. 9 and identified as 103 and 104. To facilitate chip clearance, a pressurized air line is connected to supply pressurized air to each of the buttons, as illustrated at 107 in response to an automatic air control 108.

Original extensible advancement of arm 55 from retracted position had been effected by energizing solenoid 101 to advance valve spool 78 leftwardly into position to connect valve spool line 102 therein to transmit pressure fluid from supply line 82 to inlet line 63. Since pressure fluid from line 63 then enters the rearward end of cylinder 61, piston 60 is urged extensibly outward to have originally effected like extensible movement of the associated parts including pallet arm 55 and pallet 30 into the operating station 32. Forward movement of piston 60 results in fluid then being exhausted from the forward end of cylinder 61 via return line 62 connected by leftwardly urged valve spool 78 to exhaust line 83. As soon as pallet 30 had originally been advanced to the operating station 32, however, solenoid 101 was deenergized and solenoid 77 reenergized to again retract the now empty pallet arm 55 to the position shown in FIG. 9, as described. Solenoid 77 was then likewise retained in energized condition in order to dynamically maintain the empty pallet arm 55 in storage position to facilitate a pallet interchange with pallet 30 now clamped to the table 27.

Extensible outward movement of pallet arm 65 along with the associated pallet 50 latched thereto is effected in similar manner by deenergizing solenoid 87 and simultaneously energizing a solenoid 105 to move valve spool 88 into leftward engaged position. Movement of valve spool 88 to leftward energized position connects pressure supply line 82 via a valve spool port 106 to inlet supply line 73 connected to the rearward, inner end of cylinder 71. Pressure fluid is then returned from the front end of cylinder 71 via line 72 and through a port in leftward valve spool 88 to the exhaust line 83. Extensible outward movement of pallet arm 65 together with pallet 50 latched thereto is selectively available from an inner retracted position whenever the pallet support 47 is indexably positioned as shown in FIGS. 1, 2 and 9. Usually, however, such extensible outward movement of pallet support arm 65 together with pallet 50 latched thereto, comprises a sequential part of a pallet interchange cycle and occurs in predetermined sequence immediately after pallet support 47 is indexably advanced 180° from the position shown in FIG. 4 to the position shown in FIG. 5.

Between the sequential steps of extensibly moving the pallet engaging arms 55 and 65 into the operating station 32 to effect a complete pallet interchange cycle, the pallet support 47 is indexably positioned 180° in either a clockwise or counterclockwise direction. As will hereinafter be explained and as shown in FIG. 9, two pivotally mounted, and selectively extensible power cylinders 120 and 121 are coordinately connected to provide a simplified source of rotative power adapted to indexably move the pallet support 47 a full 180° in either a clockwise or counterclockwise direction. In addition, the twin pivotal cylinder indexing device of the present invention provides a variable velocity control not heretofore available in interchange mechanisms. Before describing the indexable structure that is rotatively driven by the combined pivotal and extensible power cylinders 120 and 121, it should be noted that the stationary and rectilinearly movable power cylinders 61 and 71 are mounted in lateral, parallel positions. This relationship is better illustrated in FIGS. 2 to 6 inclusive which show in simplified diagrammatic form the successive steps involved in effecting a pallet interchange between the machine index table 27 and pallet changer 44.

In FIG. 2, the pallet index table 24 together with the pallet 30 clamped thereto are still in the machining station 31 adjacent spindle 40 and spacked a considerable distance away from the pallet changer 44. The pallet support 47 is indexably retained in clockwise position with the empty storage station A ready to receive pallet 30 now clamped to the index table 27; likewise storage station 47B is supporting pallet 50 for transfer movement to the table 27. As shown in FIG. 2, the respective stationary pallet control cylinders 61 and 71 are fixedly carried by the pallet support 47, and are mounted in end to end, as well as laterally spaced positions. Stationary cylinder 61 for pallet 30, therefore, extends rightwardly in station 47B and beneath pallet 50 presently carried thereby. As explained, retracted pallet arm latch 91 is connected by bracket 58 to piston rod 59 retracted within cylinder 61. As also indicated in FIG. 2, stationary cylinder 71 to control pallet 50 extends leftwardly within the presently empty storage station 47A.

Figure 6:
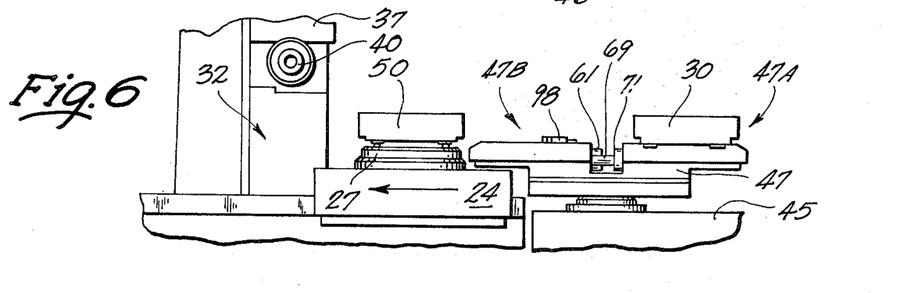

Thus, cylinders 61 and 71 are fixedly secured within the storage stations 47B and 47A in parallel, laterally spaced apart positions, as well as rectilinearly spaced apart position. After a complete interchange of pallets has been effected, pallet 30 is returned to storage and pallet 50 is clamped to the table 27. In FIG. 6, for example, there is illustrated the indexably interchanged position of the pallet storage stations 47A and 47B with pallet 50 now clamped to index table 27. Further, stationary pallet control cylinders 61 and 71 are also in indexably interchanged positions relative to the operating station 32. Thus, the now empty and retracted pallet latch 98 (for pallet 50) is secured by a bracket (not shown) to piston rod 69 fully retracted within the cylinder 71 extending rightwardly within pallet station 47A.

Figure 4:
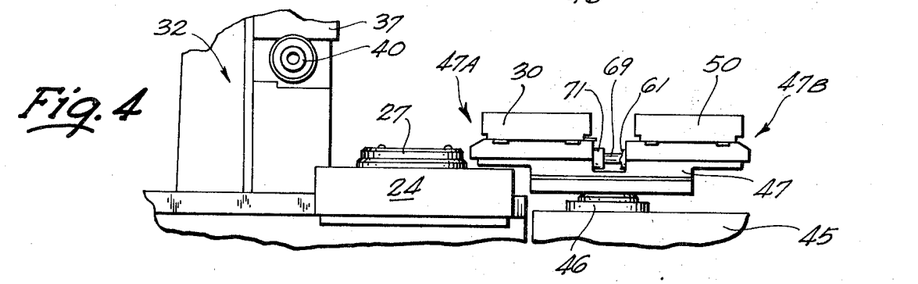

Prior to actually initiating a pallet interchange, work table 24 is moved rightwardly along the X axis from the machining station 31 into operating station 32, shown in FIG. 3 and into the closest possible proximity to the now empty pallet storage station 47A by operating motor 42. Upon arrival of table 24 in its maximum rightward position, FIG. 3, cylinder 61 is actuated to effect maximum extensible movement of piston rod 59 and latch 91 into outward engaged position with pallet 30 now in its downwardly clamped position with buttons 103, 104 presented by the pallet table 27. Table 24 then releases pallet 30 by urging it upwardly into clamped engagement with latch 91 of outwardly extended piston rod 59 which is then retracted to move the then latched pallet 30 into parked position in storage station 47A, as shown in FIG. 4. After both pallets are returned to storage as shown, the pallet changer index table 46 is indexed 180° in a counterclockwise direction, FIG. 5, to effect a like indexing movement of pallet support 47 and the respective pallets carried thereby. Cylinder 71 is then actuated to effect extensible advancement of piston rod 69 and the latch 98 engaging pallet 50 to advance the latter into operatively clamped position on the pallet table 27. As soon as pallet 50 is clamped to the pallet table 27, the then released pallet latch 98 and piston rod 69 are retracted to empty storage position 47B, as shown in FIG. 6. After a pallet interchange has been completed, as shown in FIG. 6, table 24 is returnable to the operating station 31 together with pallet 50 clamped thereto (and a workpiece not shown).

Figure 7:
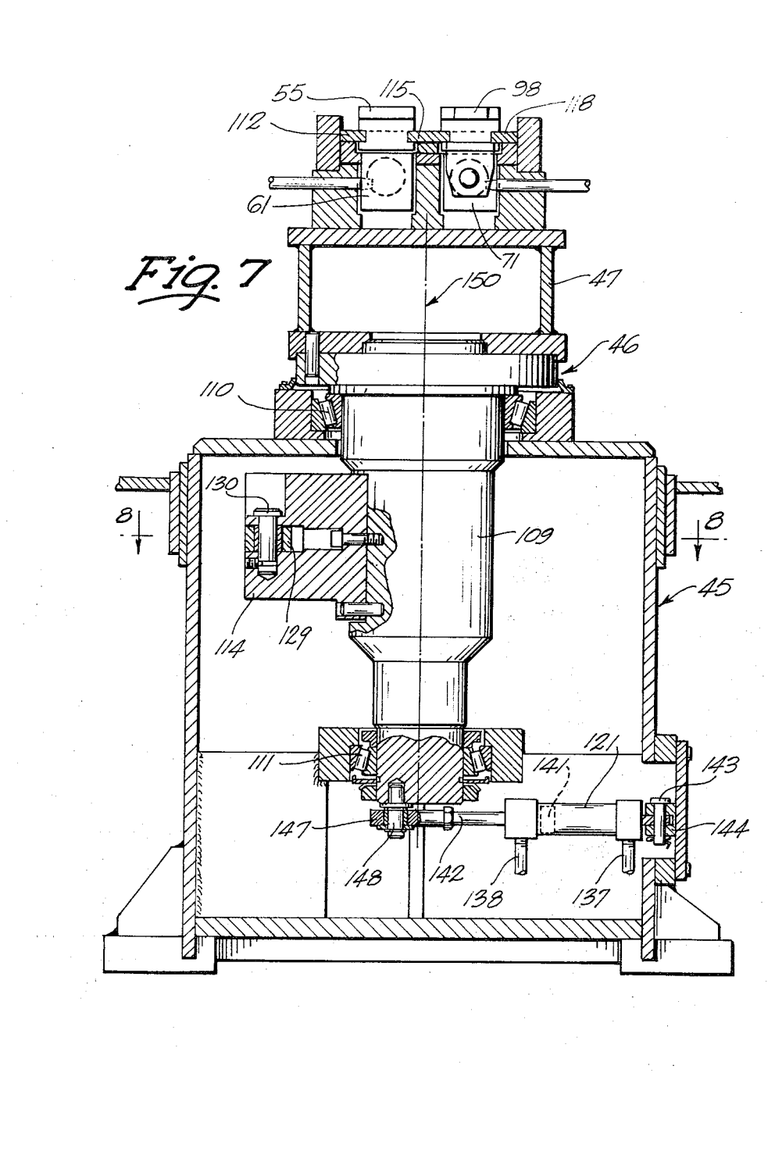
FIG. 7 is a view partly in transverse vertical section and partly in elevation through the vertical column.
Figure 8:
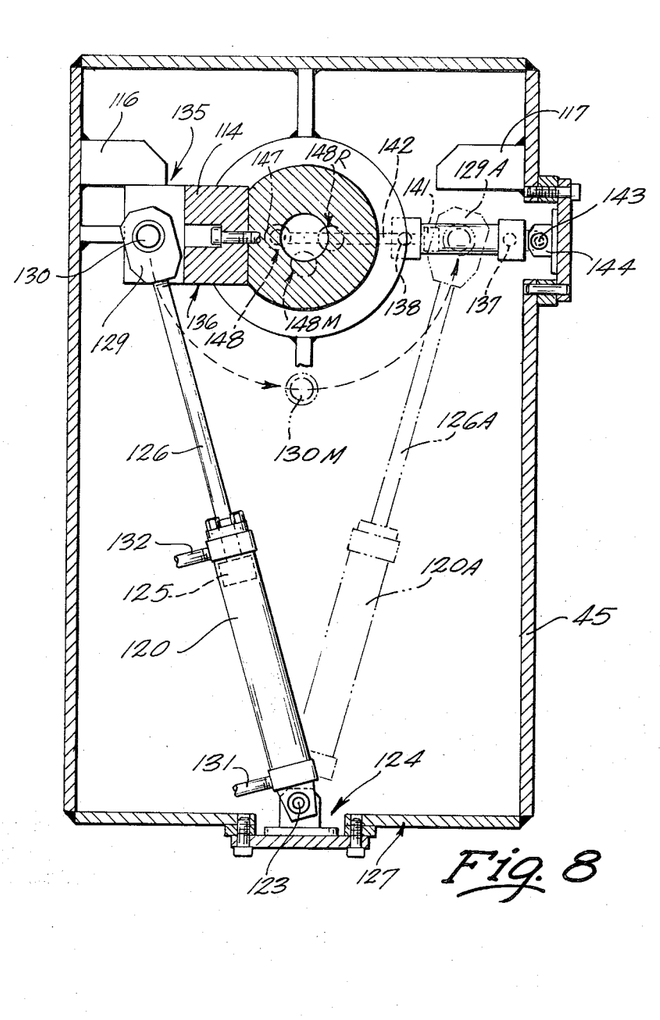
FIG. 8 is a view taken along a horizontal plane represented by the line 8—8 in FIG. 7.

AS shown in FIGS. 7, 8 and 9, the pallet support index table 46 is carried by an integrally formed vertical column or base 109 rotatably journalled in vertically spaced apart bearings 110 and 111 mounted within the work changer base 45. A radial arm 114 is fixedly secured to the central portion of the vertical column 109 for 180° rotation therewith between position determining positive stops 116 and 117 fixedly secured to the opposite inner walls of the base 45. To provide power for selectively rotating the vertical column 109 and radial arm 114 presented thereby in either direction between the positive stops 116 and 117, radially and vertically spaced apart portions of the column 109 are coordinately driven by separate rectilinearly extensible power cylinders 120 and 121 pivotally secured to spaced apart portions of the frame 45. The upper and principal power cylinder 120 is supported at its outer end by a vertical pivot pin 123 journalled in a stationary bracket 124 affixed to an inner rearward wall 127 of the work changer base 45. To provide actuating power, a slidable power piston 125 within the pivotal cylinder 120 is secured to the rearward end of a piston rod 126. The arrangement is such that piston 125 cannot bottom or abut either inner end of cylinder 120, even when at the limit of the stroke of piston rod 126 in either opposite direction. A mounting bracket 129 fixedly secured to the forward end of the rectilinearly movable piston rod 126 is, in turn, pivotally supported by a parallel, vertical pivot pin 130 fixedly mounted in the radial arm 114 secured to the pivotal column 109. As presently viewed in FIGS. 7, 8 and 9, dynamic hydraulic control circuits are initially completed and then maintained to dynamically supply pressure fluid to a rear inlet 131 for cylinder 120 and connecting the front inlet 132 to exhaust. During this condition, pressure fluid via rear inlet 131 urges piston 125 and piston rod 126 forward as shown. As explained, the opposite ends of the extensible cylinder 120 and cooperatively movable piston rod 126 are pivotally supported by the parallel spaced apart, and relatively bodily movable pivot pins 123 and 130. The front face 135 of radial arm 114 forcibly abuts positive stop 116 whenever pressure fluid enters rear inlet 131 as shown and described, due to the clearance between piston 125 and the forward inner end of cylinder 120.

Simultaneously with maintenance of the described fluid circuit forcibly urging the radial arm face 135 into abutting positioning engagement with clockwise CW positive stop 116, a coordinate fluid circuit is maintained to supply pressure fluid to a rear inlet 137 for cooperatively disposed pivotal cylinder 121. An exhaust circuit is then completed from the opposite or inner end of the cylinder 121 by an outlet 138. Pressure fluid entering the rear inlet 137 of cylinder 121 urges an associated piston 141 and piston rod 142 to the forward limit of extensible rectilinear movement, as shown. Incidentally, power cylinder 121 is pivotally supported at its outer end by a stationary pivot pin 143 mounted in a bracket 144 affixed to an inner side wall of the base 45, preferably spaced approximately 90° from the stationary pivot pin 123 supporting the pivotal power cylinder 120.

The forward or inner end of the rectilinearly movable piston rod 142 is secured to a bracket 147 journalled on a vertical pivot pin 148 fixedly secured in a radial offset position to the lower end of the vertical column 109. The length of piston rod 142 between pivot pin 148 presented by the column 109 and piston 141 is such as to prevent the opposite faces of the piston from abutting either inner end of the cylinder 121, even when at the inner end of the stroke in either direction. To maintain the CW angular position, a control circuit simultaneously continues to supply pressure fluid to both rear inlets 137 and 131, with extensible pressure from power cylinder 120 alone exerting full positional control. While maintaining the clockwise angular position shown, pressure fluid entering rear inlet 137 for urging piston 141 and piston rod 142 to exert extensible pressure between parallel spaced apart pivot pins 143 and 148 has no effect on continuing position. During 180° CCW angular movement of the column 109 from the CW position shown, however, power actuating cylinder 121 cooperates with the power actuating cylinder 120 to provide rotatable actuating power. In like manner, both pivotal power cylinders 121 and 120 are necessary to provide a supply of power in effecting a return 180° CW rotation of the column from its CCW position.

Before describing the coordinate operation of the pivotal mounting of the extensible power cylinders 120 and 121 in effecting 180° arcuate pivotal movement between the CW and CCW stops 116 and 117, attention is again directed to the combined vertical and lateral spacing between the pallet actuating arms 55 and 65, as shown in FIG. 7. It will be recalled that the lateral and rectilinear spacing of the pallet actuating arms 55 and 65, together with the respective pallet latches 91 and 98 respectively secured to the outer ends thereof, have already been briefly described in FIGS. 2, 6 and 7. However, the rectangular configuration of the actuating arms 55 and 65 and provided by spaced apart rectilinear guideways 112, 115 and 118, as well as the parallel lateral spacing therebetween, is shown in somewhat greater detail in FIG. 7. In considering prior movement of these parts to present positions, it will be assumed the angular orientation of the vertical column 109 and pallet support 47 carried thereby to dynamically maintained clockwise position, is identical in FIGS. 3, 7, 8 and 9. Consequently in these particular views the respective pivot pins 130 and 148 are both concentrically spaced in a clockwise, radially transverse direction relative to the column 109 and the radial arm 114 fixedly secured thereto. In addition, piston 125 is urged to the extensible limit of its forward stroke within cylinder 120 to forcibly retain the outer face 135 of radial column arm 114 in clockwise positioning engagement with stationary positive stop 116. Simultaneously, piston 141 is being urged to the limit of its single, forward extensible stroke within cooperating pivotal cylinder 121 to forcibly maintain the associated pivot pin 148 at the limit of its pivotal, radial movement relative to the axis 150 of the column 109.

Effecting 180° counterclockwise angular movements of column 109 from engagement with the CW stop 116 requires two separate and complete power strokes of piston 125 within pivotal cylinder 120 in coordination with one continuous power stroke of piston 141 within cooperating pivotal cylinder 121. Because of the coordinate hydraulic control of the separate pivotal power cylinders 120 and 121, the 180° angular movement of the column from one stop to the other is continuous with velocity being automatically and coordinately varied. During the first 90° of CCW movement of column 109, pistion 125 is urged to its full retracted position within pivotal cylinder 120 with pressure fluid being admitted via front inlet 132 and exhausted via rear inlet 131. Upon pivotal arrival of cylinder 120 at its 90° midpoint position, power piston 125 will be at the inner retracting limit of its stroke thereby causing the pivot pin 130 at the inner end of retracting piston rod 126 to move to its corresponding 90° midpoint position as indicated at 130M.

Immediately upon pivotal arrival of cylinder 120 at the 90° midpoint position, the flow of control pressure thereto is reversed with rear inlet 131 then being connected to receive pressure fluid and forward inlet 132 connected to exhaust. Thus, during the second 90° segment of continuous 180° movement from the CW position, pivotal cylinder 120 is connected to provide an extensible power stroke. Arrival of column 109 in its angular advanced position is effected upon coordinated forward pivotal movement of cylinder 120 to its broken line position 120A, FIG. 8, and simultaneous extensible advancement of piston 125 and piston rod 126A to the forward limit of extensible movement. As this occurs, mounting bracket 129A secured to piston rod 126 and journalled on pivot pin 130 forcibly urges the outer face 136 of radial arm 114 into continuous abutting engagement with CCW stop 117. In effect, power cylinder 120 provides a bidirectional power stroke and includes reverse means to render the output unidirectional through a full 180° of movement in either CW or CCW direction; and thus corresponding with the single unidirectional power stroke from cylinder 121.

To insure a uniform continuity of 180° angular movement from the CW stop 116 to CCW stop 117, pivotal cylinder 121 is actuated through a single retractable power stroke coordinately with pivotal cylinder 120 being successively and sequentially actuated in a 90° retractable and a 90° extensible power stroke. Upon arrival of column 109 at its 90° midpoint position, pivot pin 148 at the outer end of piston rod 142 is in its radial midpoint position identified as 148M in FIGS. 8 and 9. This is concentric to the 90° position of pivot pin 130M which is then at the end of the first power stroke of outer power cylinder 120. Arrival of inner pivot pin 148M at its 90° midpoint position, however, occurs upon arrival of piston 141 midway between the start and finish of its single retractable power stroke within the 90° spaced apart pivotal power cylinder 121. Concentric arrival of bodily rotatable pivot pins 130M and 148M at the described mid-positions occurs concomitantly upon arrival of the associated power actuating pivotal cylinders at corresponding midpoint positions, as indicated by dotted lines 120M and 121M. A complete, single power retracting stroke of piston 125 in cylinder 120 simultaneously effects circular movement of the outer pivot pin in its dotted line position 130M as the outer cylinder is being pivotally urged to its midpoint position 120M. Coordinately therewith, the first half of a power retractive stroke of piston 141 in cylinder 121 simultaneously effects circular movement of the inner pivot pin to its dotted line mid-position 148M as the spaced apart power cylinder is being moved to its intermediate or midpoint position indicated in fragmentary form by the dotted line 121M.

Continuance of counterclockwise indexing movement is insured by pressure fluid being supplied to inlet 138 for urging associated piston 141 outwardly within pivotal cylinder 121 to supply a continuous 180° retracting pressure stroke during CCW indexing. Simultaneously with the described conditions for operating pivotal cylinder 120 to effect two successive quadrants of CCW movement, a single pressure circuit is established via inlet 138 with outlet 137 then being connected to exhaust. Thus, counterclockwise indexing of column 109 is continued by pressure to inlet 138 urging movement of piston 141 to the limit of its retractable stroke within pivotal cylinder 121 to effect continued, bodily circular movement of the inner pivot pin from its mid-position 148M to its full CCW position, as indicated at 148R. After the inner pivot pin has been moved from its forward CW position, indicated at 148, a circular distance of 180° to its outer CCW position, indicated at 148R, it will be apparent that the actuating power piston 141 is dynamically maintained at the outer limit of its retractable stroke in pivotal cylinder 121.

Having initiated 180° CCW movement of column 109 from the CW position as described, the column 109 and pallet support 47 are forcibly maintained in the selected CCW position by continued pressure supplied to inlets 131 and 138 for the respective pivotal cylinders 120 and 121. With the column 109 and index table 46 carried thereby indexably rotated 180° to counterclockwise position, it will be equally apparent that the pallet support 47 carried by index table 46 is indexably urged to counterclockwise position. Further, the described 180° indexing movement of pallet support 47 in CCW direction, conforms to indexable interchange of pallet stations 47A and 47B from CW positions, FIG. 4, to CCW positions, FIG. 5, and comprises a part of a continuous pallet interchange cycle.

Upon completion of the described CCW indexing movement, the column 109 is indexably returnable from the fluid pressure maintained CCW position by effecting a similar coordinate actuation of the respective pressure actuating pivotal cylinders 120 and 121. It is again emphasized that column 109 and pallet support 47 carried thereby are dynamically maintained in pressure actuated engagement with CCW positive stop 117 by a continuous supply of pressure fluid to inlets 131 and 138, and due to clearance provided at the front faces of pistons 125 and 128. With these circuit conditions established, selective 180° return movement from CCW position is then initiated by simultaneously connecting both outer fluid inlets 131 and 138 to exhaust. Coordinately therewith, a circuit is established to supply pressure fluid to inlet 132 for cylinder 120 in its rightward pivoted position and to inlet 137 for cylinder 121 with piston 141 in fully retracted position.

Pressure actuated 180° angular return movement of column 109 from the described CCW position to originally illustrated CW position is thus effected by sequential operation of pivotal cylinder 120 to provide two 90° power strokes coordinately with cylinder 121 being actuated to provide a single 180° outwardly extensible power stroke. In other words, from CCW position, cylinder 120 is first actuated to again provide a 90° retractable power stroke to move the outer pivot pin in a CW direction to its midpoint position as indicated at 130M. Upon arrival in that position and upon completion of the 90° retractable power stroke from CCW position, the pressure circuit to cylinder 120 is reversed by connecting inlet 132 to exhaust and inlet 131 to receive pressure fluid. Continued return movement of the column 109 through the second 90° segment of rotation and into positioning engagement with CW stop 116 is again effected by connecting the pivotal cylinder 120 to provide an extensible power stroke.

In either 180° clockwise or counterclockwise indexing of column 109, it will be apparent a "dead spot" may occur at the moment of reversing the power output from pivotal power cylinder 120. This might happen, for example, at the moment of reversing the fluid supply to switch the cylinder 120 from providing a retractable power stroke to providing an extensible power stroke. To preclude any hesitation or interruption in either CW or CCW indexing movement, therefore, the single pivotal power cylinder 121 is operable to provide the single 180° power stroke coordinately with the two 90° power strokes from cylinder 120. In effecting return movement from CCW to CW position, the flow of pressure fluid is directed to inlet 137 for urging piston 141 leftwardly from its extreme outward retracted position (not shown). In other words, the piston 141 is returned from retracted position (not shown) to its illustrated pressure actuated forward position in cylinder 121. Continued connection of line 138 to exhaust and line 137 to pressure thus urges piston rod 142 to move outward and provide a single 180° extensible power stroke. Continued extensible CW pressure applied by piston rod 142 forcibly urges the inner pivot pin to rotate from extreme CCW retracted position at 148R, through the intermediate position 148M, and finally to CW position, as indicated by the solid lines at 148.

In summary and in terms of function, a pallet interchange can be effected in approximately seven principal power actuated sequential steps. The starting conditions are assumed to be those illustrated and described in connection with FIGS. 3, 9 and 11. In other words, pallet 30 is clamped to pallet table 27 which is carried by table 24 positioned in close proximity to pallet changer 44. Next, pallet support 47 is indexably positioned, as shown, with pallet storage station 47A empty and storage station 47B carrying pallet 50 in position for transfer to pallet table support 27.

Figure 5:
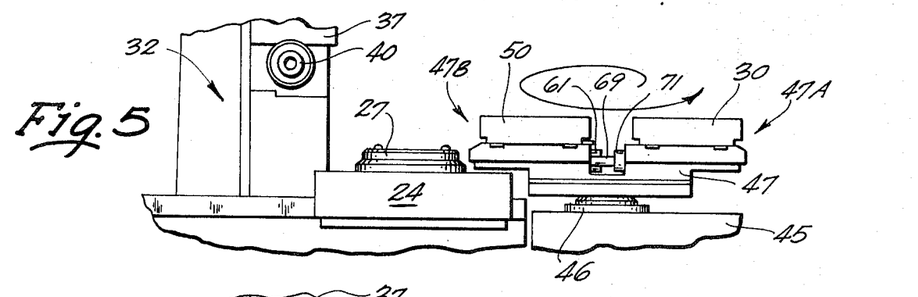

Assuming the conditions briefly enumerated in FIGS. 3, 9 and 11, the principal steps necessary for a pallet interchange include:

1. By either manual, numerical control, or other types of starting, energize solenoid 101 to extensibly advance empty pallet arm 55 and latch 91 rectilinearly outward to engage pallet 30 (FIG. 11) clamped to pallet table 27;

2. Automatically energize the solenoid to elevate pallet clamp 93 to dotted line position 93R for moving pallet 30 vertically upward into latched engagement with outwardly extended arm latch 91 (FIG. 10);

3. Retract arm 55 with pallet 30 latched thereto by engaged latches 90, 91 (FIG. 10) and return the pallet 30 into storage station 47A;

4. Energize solenoid 29S to indexably interchange the positions of storage stations 47A and 47B (and the pallets carried thereby) as shown in FIG. 5;

5. Extensibly advance pallet arm 65 to move the pallet 50 latched thereto into rectilinear outward engagement with the now empty pallet table 27, (similar to FIG. 10);

6. Move pallet clamp 93 vertically downward to both disengage pallet 50 from latched engagement with outwardly extended arm 65 and clamp pallet 50 to pallet table 27 for subsequent indexable movement therewith; and, 7. Retract the now empty pallet arm 65 to storage position in empty storage station 47B.

To avoid the necessity of providing an overly detailed electrical circuit interconnecting the various solenoids, valves and switches comprising the control illustrated in FIGS. 9, 10 and 11, it is reiterated that each of the seven power functions hereinbefore enumerated is electrically initiated. Further, sequential completion of each of the seven steps simply results in termination of the step being performed and like switch actuated energization of each successive function during a single pallet interchange cycle. As already explained, however, completion of a step usually involves continued electrical energization of the prior step just completed by means of the hydraulic control system. Thus, a continued dynamic braking effect is maintained particularly adapted to facilitate initiating the next seven step interchange cycle.

To greatly simplify the explanation of the electrical control circuit operative to effect a selected pallet or workpiece interchange, the control circuits in FIGS. 9, 10 and 11 have been distinctly marked in several different ways. In addition to the usual reference numerals, the sequence of seven power actuated steps in a pallet change are identified in numerical sequence by numbers with a single letter suffix, and a double letter where required, (for example 1A, 2A, 2AA). In addition, the dynamically energized solenoids and actuated switches that require actuation to initially establish the assumed starting conditions are identified by a letter E followed by a letter suffix.

The energized starting solenoids and actuated switches include the following:

EA — Solenoid 173 is energized to establish dynamic conditions for simultaneously urging pivotal cylinders 121 and 120 to presently illustrated CW positions. With solenoid 173 energized, valve spool 180 is urged rightwardly. As a result, valve spool line 203 is likewise moved rightward to connect pressure line 82 to output line 205 which simultaneously establishes two circuits. First, pressure fluid from output line 205 is connected via branch line 137 to supply pressure to the rearward end of pivotal cylinder 121 to forcibly maintain piston 141 in its forward CW position as shown. Second, pressure fluid from output line 205 continues a leftwardly urged valve spool line 208 presently connected to direct pressure fluid to the rearward end of pivotal cylinder 120.

EB — Incidentally, quadrant control solenoid 172 is presently energized to retain valve spool 191 in its quadrant No. 1 switch position, as shown, due to the fact that quadrant control switch 188 has not been actuated. Therefore, pressure fluid received from line 131 urges piston 125 forwardly to forcibly maintain radial arm 114 in abutting engagement with CW stop 116.

EC — Control switch 179 is maintained actuated, as shown, by retention of control dog 178 (secured to column 109) in its present CW urged direction, thereby establishing the necessary circuit conditions to retain solenoids ED and EG energized.

ED — Energization of solenoid 77 effects rightward movement of valve spool 78 to supply pressure fluid to line 62 for urging piston 60 rightward, retaining empty pallet arm 55 fully retracted in now empty pallet storage station 47A.

EF — Control dog 56 is now maintained in actuating engagement with fixed limit switch 57.

EG — Energization of solenoid 87 urges valve spool 88 rightward to supply pressure fluid to line 72 for urging piston 70 leftward to maintain pallet arm 65, including pallet 50, latched thereto, fully retracted in storage station 47B. EH — Control dog 66 is retained in actuated engagement with fixed limit switch 67.

EI — Valve spool 154 actuated leftward by spring 157.

The seven power actuated sequential steps required to complete a pallet interchange are described in somewhat greater detail in combination with FIGS. 9, 10 and 11 as follows.

As before explained, start a pallet interchange by manual or electrical energization of solenoid 101.

1A — Energize solenoid 101 and deenergize solenoid 77 to urge valve spool 78 leftward and connect line 102 to supply pressure fluid to extensibly urge pallet arm 55 and latch 91 outwardly to engaged position with pallet 30 now downwardly clamped to pallet table 27.

2A — Extensible movement of arm 55 moves the rear control dog 152 carried thereby into pressure actuated engagement with switch 57 to establish a control circuit connected to energize solenoid 153 to move valve spool 154 rightwardly in opposition to resilient actuator 157. Rightward movement of valve spool 154 moves diagonal valve spool line 156 rightwardly, completing a circuit from pressure supply line 82 to a line 160 connected to supply pressure to a line 160. Fluid pressure to line 160 urges the pallet clamp vertically upward to its dotted line position 93R. At the same time, pressure fluid is exhausted from the underside 163 of the pallet clamp 93 by a line 164 connected via rightwardly positioned valve spool line 165 connected to exhaust 166. Upward movement of pallet clamp to its dotted line position at 93R moves pallet 30 into upwardly latched engagement with outwardly extended pallet arm latch 91 and actuated control switch 168 (2AA) which is operatively connected to initiate a retracting stroke of pallet arm 55.

3A — In response to actuation of switch 168, a control circuit is re-established to deenergize solenoid 101 and re-energize solenoid 77 thereby returning valve spool 78 to extreme rightward position. As a result, valve spool line 80 is again moved rightward to establish a control circuit from pressure line 82 to a line 170 connected to fully retract pallet arm 55 and pallet 30 latched thereto, and returning pallet 30 to storage position 47A. Return arrival of latched pallet 30 to storage (47A) again moves control dog 56 into actuating engagement with switch 57.

4A — Actuation of switch 57 operatively establishes a control circuit to coordinately control pivotally extensible cylinders 120 and 121 to effect 180° CCW movement of column 109 and storage stations 47A and 47B carried thereby. This circuit immediately deenergizes CW control solenoid 173 and energizes CCW control solenoid 174. Incidentally, original retention of pivotal cylinders 120 and 121 in presently illustrated CW position had been effected by energization of quadrant No. 1, control solenoid 172, and CW control solenoid 173. The original circuit to energize these solenoids had been initiated and maintained by CW control dog 178 secured to column 109 being rotated into actuating engagement with switch 179 secured to work changer base 45A. Although CW control solenoid 173 is immediately deenergized upon energization of CCW solenoid 174 in response to initial reactuation of switch 57, solenoid 172 remains energized through the first quadrant of movement of column 109 in CCW direction. Energization of solenoid 174 moves valve spool 180 leftwardly to connect leftwardly moved valve spool line 182 to complete a circuit from pressure supply line 82 to a line 183 which supplies pressure to both cylinders 120 and 121.

To initiate a 180° retractive pressure stroke of cylinder 121, pressure fluid from line 183 flows immediately to input line 138. With solenoid 172 remaining energized, valve spool line 185 is positioned (as shown) to complete a circuit from line 183 to line 132 connected to initiate a CCW positioning circuit by urging piston 125 to the rightward limit of its stroke in pivotal cylinder 120. As explained, this CCW circuit is maintained through the first 90° of movement. As the pivotal cylinder 120 moves through its 90° position indicated by the dotted lines at 120M, the leading edge of a quadrant control cam 187 secured to a spaced apart portion of column 109A is moved into actuating engagement with a quadrant control switch 188. As shown in FIG. 9, quadrant control switch 188 is fixedly secured to a spaced apart portion of the work changer base 45B. To better illustrate the 180° positioning movement, the laterally spaced apart portion of the column 109A is also provided with a radially extending arm portion 114A that is arcuately movable between the 180° spaced apart positive stops 116 and 117 respectively presented by the work changer base 45.

It will be apparent that once the quadrant control switch 188 is actuated by the control cam 187, such actuated condition is maintained through the 90° balance of CCW rotation of the column 109. Actuation of switch 188, as described, immediately initiates a circuit to deenergize solenoid 172 and energize solenoid 190 to effect rightward movement of valve spool 191 to its extreme rightward position from its present position. As a result, the corresponding rightwardly moved valve spool line 192 connects the pressure supply line 183 (caused by the still energized solenoid 182) to reconnect the flow of pressure fluid from input line 132 to input line 131 for pivotal cylinder 120. As explained, input pressure from line 131 is connected to the rearward end of pivotal cylinder 120 (now in its dotted line mid-position) thereby immediately reversing the movement of piston 125 to initiate 90° clockwise movement of column 109 as a continuous portion of the same 180° CCW cycle. Energization of solenoid 174 therefore continues to supply pressure fluid from line 183 to the single pressure line 138 to continue moving piston 141 in its single CCW stroke coordinately with reversing piston 125 to move forwardly in its 90° CW stroke comprising part of the same 180° CCW stroke.

Completion of CCW movement is determined by arcuate movement of radial arm 114 into engagement with positive CCW stop 117 and simultaneous arcuate movement of CCW control dog 196 a distance of 180° into position to actuate stationary control switch 179 affixed to work changer base 45A. The selected 180° CCW indexing of column 109 and pallet supports 47A and 47B secured thereto is completed as described. Once initiated, the described circuit conditions are dynamically maintained by continued energization of both solenoids 174 and 190 to maintain valve spool 180 in extreme leftward position and solenoid 190 in extreme rightward position. Because of this, the established circuits are continued to dynamically urge piston 141 to the upper limit of its CCW actuating stroke and piston 125 to the inner and upper limit of its coordinate actuating stroke for dynamically maintaining radial arm 114 in positioning engagement with CCW stop 117.

5A — At the same time, actuation of fixed limit control switch 179 by CCW dog 196 initiates extensible outward movement of the 180° indexably repositioned pallet arm 65 with the pallet 50 secured thereto. Extensible outward movement of pallet arm 65 moves the pallet 50 latched thereto into engaged position above the still empty pallet index table 27.

6A — Outward rectilinear movement of pallet 50 into engaged position moves control dog 198 outward into actuating engagement with control switch 67. The latter is now connected to deenergize solenoid 153 resulting in resiliently urged leftward movement of the associated valve spool by spring 157. Pressure fluid from supply line 82 is then transmitted by valve spool line 199 of the leftwardly urged resiliently actuated valve spool to a line 164 connected to the underside 163 of pallet clamp 93. With pressure fluid now being exhausted by return line 160, pallet clamp 93 is forcibly urged vertically downward to urge the now engaged pallet 50 into vertically downward clamped engagement with the pallet index table 27 as explained.

7A — Vertically downward reclamping of interchanged pallet 50 into operating position on the pallet index table 27 results in sequential actuation of pallet switch 168. As this occurs, a sequential control circuit is established to deenergize solenoid 105 and reenergize solenoid 87 for forcibly returning the now empty pallet arm 65 to its empty storage station 47B, as hereinbefore fully explained in connection with FIG. 6.

Having explained in considerable detail the sequential actuation of control solenoids and limit switches that are operated to effect counterclockwise indexing, it is not deemed necessary to repeat this complete sequence for clockwise return indexing. Instead, the slight points of distinction between CW and CCW indexing are briefly enumerated. After effecting indexing movement of the column 109 and pallet support 47 to full CCW position, the circuit conditions necessary to achieve that condition are dynamically retained to facilitate return movement to CW position. Briefly stated, solenoid 174 is retained energized to urge valve spool 180 to full leftward CCW position simultaneously with solenoid 190 being retained energized to urge solenoid 191 to rightwardly urged quadrant No. 2 position. It is reiterated that CCW positioning requires simultaneous power actuated retention of pivotal cylinder 120 in its 180° rightward CCW actuating position (as shown at 120A, 126A, 129A in FIG. 8), as well as retention of piston 125 at the extreme forward limit of movement in cylinder 120A. At the same time, piston 141 is forcibly retained at the extreme rearward end of its single retracting stroke in cooperating pivotal cylinder 121.

Dynamically established return movement from CCW to CW position is now effected by simultaneously deenergizing solenoid 174 and reenergizing clockwise control solenoid 173. Energization of solenoid 173 again effects extreme rightward movement of valve spool 180, connecting valve spool line 203 to transmit pressure fluid directly to branch line 205. With the CCW position now established, however, pressure fluid to branch line 205 connects cylinder 121 to initiate a single 180° extensible stroke coordinately with connecting cylinder 120 to successively initiate a 90° retracting and a 90° extensible stroke. Branch line 205 first initiates a circuit supplying pressure fluid to line 137 connected directly to the extreme rearward end of cylinder 121 to urge the now fully retracted piston 141 to begin a 180° extensible circuit.

As previously mentioned, a direct and important result of the present invention is a greatly improved velocity control that is achieved essentially by a flow control valve 162, FIG. 9, operably connected in the hydraulic control circuit of the present invention. Briefly stated, during 180° arcuate movement in either CW or CCW direction, the arrangement is such that velocity gradually increases during the first 90° and reaches a maximum rate of velocity at the 90° midpoint position which conforms to the point of reversal of the primary power actuator 120, FIG. 9. Although movement is continuous through the 90° midpoint position, as explained, and due to the inertial mass of the member being carried, flow control valve 162 so cooperates with the primary power actuator 120 as to directly modify the movement through the second 90° which continues at a gradual rate of decrease proportional to the rate of increase during the first 90°.

In further explanation with reference to initiating CCW movement, it will be recalled the first 90° retracting stroke of cylinder 120 initiated movement from the CW position shown to the 90° midpoint position indicated at 130M. At this time, the input pressure from supply line 82 to the now connected input line 132 for driving piston 125 of cylinder 120 in a first 90° CCW retracting stroke is constant. At this time likewise, therefore, the primary force for increasing velocity is developed by hydraulic pressure.

At the 90° midpoint position in CCW direction, piston 125 is at the extreme inner end of its retracting stroke and, at the moment of reversal, beginning a forward or extensible pressure stroke for the remainder of the 180°. To effect this reverse, supply line 82 now provides constant pressure to supply line 131 connected to move piston 125 forwardly under constant pressure. At this time, however, and during the second 90° of movement, exhaust pressure fluid in front of the now forwardly moving piston 125 flows out line 132, and through diagonal valve spool line 193 of the now energized quadrant No. 2 solenoid 190. The flow of exhaust pressure fluid continues from diagonal line 193 to line 205 now connected by a line 158 in valve spool 155 controlled by now energized solenoid 174, and continues through the line 159 to flow control valve 162 which operates in well-known manner to retard the flow of return pressure fluid.

Retracing this particular branch control circuit is reverse direction to its starting point, i.e., to the front face of the now forwardly moving piston 125 during its described second 90° quadrant of movement in a 180° CCW stroke, reveals the fact that the exhaust pressure gradually increases to exert a gradually increasing decelerating effect. During the second 90° segment of movement, the decelerating force or pressure exerted by flow control valve 162 on the front face of forwardly moving piston 125 actually exceeds the supply pressure now being provided on the opposite face of that piston from the now connected input pressure supply line 131.

With decelerating pressure being automatically varied in the novel manner described, the rate of deceleration likewise varies automatically as described. Due to the novel interconnection between the two separate 90° quadrants of 180° driving power provided by the reversibly operable bidirectional primary power actuator 120, it will be readily apparent that this arrangement provides a greatly improved rate control.

From the foregoing detailed description of the illustrative embodiment set forth herein to exemplify the present invention, it will be apparent that there has been provided an improved pallet and work change mechanism in combination with an improved index control mechanism for effecting 180° clockwise and counterclockwise indexing movement. Furthermore, in lieu of the novel switch responsive quadrant control cam operative to alternatively control separate quadrant control solenoids, for example, these quadrant control functions can be directly and hydraulically controlled by a commutating valve. Such a commutating valve would be operative to further simplify the control by being selectively connected for automatically reversing the port relation of one portion of a pivotal cylinder relative to another portion of the same cylinder in mid-stroke. In similar manner, such a commutating valve is connectable and selectively rotatable to change the port relation of one pivotal cylinder relative to another pivotal cylinder with both cylinders coordinately operative to effect 180° indexing movement.

In either case, the novel purpose and result is similar in selectively changing the directional port relationship by selectively reversing the supply drain relationship to the combination in such a manner as to selectively reverse the 180° directional stroke of the entire assembly. In consequence, it is particularly emphasized the extremely novel and improved mechanism incorporated in the present invention permits the use of simple, relatively inaccurately manufactured and located pivotal cylinders to actuate and control 180° indexable movement with an extremely high degree of accuracy. Incidentally, this improved indexable and rectilinear control is effected without expensive geared transmissions and with non-critical relationships between the members comprising the combination.

Although the illustrative embodiments of the invention have been described in considerable detail for the purpose of disclosing a practical, operative structure whereby the invention may be practiced advantageously, it is to be understood that the particular apparatus described is intended to be illustrative only, and that the various novel characteristics of the invention may be incorporated in other structural forms without department from the spirit and scope of the invention as defined in the subjoined claims.

The principals of this invention having now been fully explained in connection with the foregoing description, we hereby claim as our invention:

1. In a workpiece changer for a machine tool having a worktable for receiving the workpieces to be operated upon;
 a workpiece storage support rotatably mounted in a frame for storing workpieces;
 means for transferring workpieces between said worktable and said workpiece support;
 a piston and cylinder mechanism having one end pivotally connected to said frame and the opposite end connected to said workpiece storage support at a point displaced from the axis of said support;
 a source of hydraulic pressure; and
 a control for regulating the flow of hydraulic pressure to said piston and cylinder mechanism to actuate said piston and cylinder mechanism in either direction to produce a partial revolution of said support for locating a new workpiece in position relative to said worktable so that said transfer means can transfer the new workpiece onto said worktable.

2. A workpiece changer according to claim 1 wherein said control reverses the operation of said piston and cylinder mechanism during the partial revolution of said support to complete the partial revolution of said support in a single direction.

3. A workpiece changer according to claim 1 including,
 an elevating mechanism for elevating the workpiece on said worktable; and
 coupling means that couple the workpiece to said transfer means when the workpiece is elevated by said elevating mechanism so that the workpiece can be moved by said transfer means, said transfer means being released from the workpiece when the latter is lowered by said elevating mechanism onto the worktable for the performance of a work operation.

4. A workpiece changer according to claim 1 including,
 a second piston and cylinder mechanism having one end pivotally connected to said frame and the opposite end connected to said support at a point displaced from the axis of said support; and
 said control regulates the operation of said second piston and cylinder mechanism for cooperation with said first piston and cylinder mechanism to complete a single partial revolution of said support in either direction.

5. A workpiece changer according to claim 4 wherein said control reverses the operation of said first piston and cylinder mechanism when said support has completed substantially one-half of its partial revolution; and
 said control maintains said second piston and cylinder mechanism operating in a single direction during the complete partial revolution of said support so that the entire partial revolution of said support is completed in a smooth uninterrupted movement.

6. A workpiece changer according to claim 4, including,
 a first stop position to be engaged by said workpiece storage support;
 and a second stop positioned to be engaged by said support when the latter is rotated in the opposite direction; and
 said piston and cylinder mechanism rotates said support against said stops individually depending upon the direction of rotation so that said stops define the extent and location of the partial revolution of said support by said piston and cylinder mechanisms.

7. In a machine tool having a work receiving operating station including releasable clamp means;
 an indexable work storage support having a first work storage and a second work storage;
 first securing means associated with said first work storage movable outwardly therefrom into secured engagement with work in said operating station;
 reverse means operative to return said first securing means together with said now secured work to stored position on said first work storage;
 a bidirectional power actuator including reverse means operative to connect a forward and reverse power stroke therefrom into one unidirectional power stroke connectable to indexably position said storage support relative to said operating station; and, second securing means associated with said second work storage operative to extensibly advance work from stored position into releasable clamped engagement with said clamp means in said work receiving station including means for returning said second securing means into empty stored position on said second work storage.

8. In a machine tool according to claim 7 including a rate control operatively connected to gradually increase the output velocity during the first half of the unidirectional power stroke; and, means to reverse said rate control operatively connected to gradually reduce the output velocity during the second half of the unidirectional power stroke.

9. In a machine tool having a work station;
a first pallet releasably clamped in said work station;

an indexable pallet support spaced in proximity to said work station;

a pair of separate individually movable pallet engaging latches carried by said support for selective indexable movement therewith and for individual bodily movement relative to said work station;

a second pallet releasably clamped to one of said pair of latches carried by said pallet support in such manner that said other latch carried thereby is empty;

first power means connected to extend said empty latch from said support into clamped engagement with said first pallet carried by said work station, said first power means being reversible to return said latch and said first pallet clamped thereto to storage position on said pallet support; and, means to indexably reposition said pallet support relative to said work station including second power means operative to extend said other latch means with said second pallet into operating engagement with said empty work station and said second power means being reversible to return said other now empty latch into an empty storage position on said pallet support.

* * * * *